United States Patent [19]
Chundury et al.

[11] Patent Number: 5,969,027
[45] Date of Patent: *Oct. 19, 1999

[54] POLYMER BLEND COMPRISING POLYPROPYLENE

[75] Inventors: Deenadayalu Chundury, Newburgh; Randall S. McAllister; Kenneth L. Overley, both of Evansville, all of Ind.; John H. Bowen, III, Tega Cay, S.C.; Anthony S. Scheibelhoffer, Norton, Ohio

[73] Assignee: Ferro Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/904,742

[22] Filed: Aug. 1, 1997

Related U.S. Application Data

[63] Continuation of application No. 08/655,277, May 15, 1996, abandoned, which is a continuation of application No. 08/351,028, Dec. 7, 1994, abandoned.

[51] Int. Cl.⁶ .................... C08J 3/18; C08J 3/34
[52] U.S. Cl. .............. 524/436; 524/494; 525/98
[58] Field of Search .............. 525/98; 524/436, 524/494

[56] References Cited

U.S. PATENT DOCUMENTS

| | | | |
|---|---|---|---|
| 3,853,808 | 12/1974 | Hishikawa et al. | 524/584 |
| 3,863,758 | 2/1975 | Connely | 525/584 |
| 4,022,749 | 5/1977 | Kuechler | 524/584 |
| 4,302,554 | 11/1981 | Nabeta | 525/71 |
| 5,198,495 | 3/1993 | Fasulo et al. | 525/71 |
| 5,264,280 | 11/1993 | Chundury et al. | 428/330 |
| 5,274,035 | 12/1993 | Chundury | 525/92 |
| 5,281,633 | 1/1994 | Okuno et al. | 523/513 |
| 5,321,081 | 6/1994 | Chundury et al. | 525/98 |
| 5,340,946 | 8/1994 | Friedrich et al. | 174/256 |
| 5,369,174 | 11/1994 | Hasselbring | 525/71 |
| 5,385,781 | 1/1995 | Chundury et al. | 428/330 |

FOREIGN PATENT DOCUMENTS

| | | |
|---|---|---|
| 0016417 | 9/1967 | Japan . |
| 2180950 | 7/1990 | Japan . |
| WO9005759 | 11/1989 | WIPO . |
| WO9313170 | 12/1992 | WIPO . |
| WO9324568 | 3/1993 | WIPO . |

*Primary Examiner*—Jeffrey C. Mullis
*Attorney, Agent, or Firm*—Rankin, Hill, Porter & Clark LLP

[57] ABSTRACT

This invention relates to a polymer blend comprising in weight percent:

A. from about 55% to about 90% of a polymer composition comprising: (i) 75% to about 100% of a homopolymer or a copolymer of polypropylene; and (ii) from about 0% to about 25% of a vinyl aromatic polymer;

B. from about 0.5% to about 9% of at least one block polymer of a vinyl aromatic monomer and an aliphatic conjugated diene, a selectively hydrogenated derivative thereof, or a selectively hydrogenated derivative thereof to which has been grafted an unsaturated carboxylic reagent, wherein the block copolymer contains up to 50% by weight bound vinyl aromatic monomer;

C. from about 2% to about 12% of at least one block polymer of a vinyl aromatic monomer and a conjugated diene, a partially hydrogenated derivative thereof, or a selectively hydrogenated derivative thereof to which has been grafted an unsaturated carboxylic reagent, wherein the block polymer contains greater than 60% by weight bound vinyl aromatic monomer;

D. from about 0.75% to about 8% fiber; and

E. from about 10% to about 40% calcium carbonate.

13 Claims, No Drawings

POLYMER BLEND COMPRISING POLYPROPYLENE

This application is a continuation of application Ser. No. 08/655,277 filed on May 15, 1996, now abandoned, which is a continuation of application Ser. No. 08/351,028 filed on Dec. 7, 1994 now abandoned.

TECHNICAL FIELD OF THE INVENTION

This invention relates to a polymer blend. More particularly, the invention concerns a fiber reinforced polymer blend comprising a homopolymer or a copolymer of polypropylene.

BACKGROUND OF THE INVENTION

Polymer blends comprising polypropylene are well-known in the prior art. Examples of such blends may be found, for example, in Fasulo et al., U.S. Pat. No. 5,198,495 which discloses a blend comprising 10–90% by weight of a vinyl aromatic polymer, 5–50% by weight of a polyolefin such as polypropylene and 5–40% by weight of a vinyl aromatic monomer-conjugated diene star block radial copolymer. Additional examples of blends comprising polypropylene may be found in Chundury et al., U.S. Pat. No. 5,264,280 which discloses various blends for use in forming thermoformable structures comprising 50–80% by weight of a polyolefin, such as polypropylene, and various combinations of vinyl aromatic compounds.

The present invention provides a unique polymer blend comprising polypropylene which has been found to be useful in replacing conventional acrylonitrile butadiene styrene (ABS) polymer resins. The blended polymer compositions of this invention may be used in a variety of applications and are useful in preparing parts for the automotive industry; communication devices such as telephones, radios, televisions, cassettes, etc.; power tools; appliances; floor care products; business machines; toys; furniture; etc.

SUMMARY OF THE INVENTION

The present invention provides a lower cost alternative to acrylonitrile butadiene styrene (ABS) polymer resins. The blend of the present invention has shrinkage comparable to ABS and thus it can be run on existing ABS tooling. As compared to ABS the blend offers improved UV stability, better ductility with equivalent stiffness, excellent recyclability and superior chemical resistance. The blend of the present invention displays excellent long-term thermal stability, ease of modability, part design flexibility, good sound dampening and is easily colored.

A polymer blend made in accordance with the present invention comprises in weight percent:

A. from about 55% to about 90% of a polymer composition comprising: (i) 30% to about 100% of a homopolymer or a copolymer of polypropylene or mixtures thereof; and (ii) from about 0% to about 25% of a vinyl aromatic polymer;

B. from about 0.5% to about 9% of at least one block polymer of a vinyl aromatic monomer and an aliphatic conjugated diene, a selectively hydrogenated derivative thereof, or a selectively hydrogenated derivative thereof to which has been grafted an unsaturated carboxylic reagent, wherein the block copolymer contains up to 50% by weight bound vinyl aromatic monomer;

C. from about 2% to about 12% of at least one block polymer of a vinyl aromatic monomer and a conjugated diene, a partially hydrogenated derivative thereof, or a selectively hydrogenated derivative thereof to which has been grafted an unsaturated carboxylic reagent, wherein the block polymer contains greater than 60% by weight bound vinyl aromatic monomer;

D. from about 0.75% to about 8% fiber reinforcement having an aspect ratio of at least 10; and E. from about 10% to about 40% calcium carbonate.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DESCRIPTION OF THE PREFERRED EMBODIMENTS

Unless the context indicates otherwise, throughout the specification and claims, the amount of the polymers present is determined inclusive of fillers, glass or other nonpolymer additives in the polymer compositions. Therefore, the amount of each polymer is determined by dividing the weight of the polymer by the combined weight of all of the components present in the composition.

Polymer Composition (A)

The polymer blend includes a base polymer composition (A). Generally, the polymer blend comprises from about 55% to about 90%, preferably from about 60% to about 80% or up to about 75%, of base polymer composition (A). Base polymer composition (A) comprises: (i) from about 75% to about 100% of a homopolymer or a copolymer of polypropylene; and optionally (ii) from about 0% to about 25% of a vinyl aromatic polymer.

Polypropylene Containing Composition (Ai)

The base polymer composition (A) includes a homopolymer or a copolymer of polypropylene (Ai) or mixtures of homopolymer and copolymer. The base polymer composition (A) typically includes from about 75%, or about 80%, or about 90% up to about 100% of a homopolymer or a copolymer of polypropylene or mixtures thereof.

The polypropylene polymers may either be semicrystalline or crystalline in structure. The number average molecular weight of the polypropylene polymers is preferably above about 10,000 and more preferably above about 50,000. The polypropylene polymers useful in preparing the polymer blends of the present invention are well-known to those skilled in the art and many are commercially available. Examples of such commercially available polypropylenes include Aristech F007S and F007F, Shell 7C06 and 5A97, Exxon PD7/32, Lyondell X0200 and X0201, Aristech 4007F and 4040F (copolymer of propylene and ethylene) and Quantum PP8479HV.

Polymers of Vinyl Aromatic Monomers (Aii)

The base polymer composition (A) may optionally include a homopolymer of a vinyl aromatic monomer, or a polymer of a vinyl aromatic monomer and at least one monomer selected from the group consisting of acrylic acid or ester, methacrylic acid or ester, acrylonitrile and maleic anhydride. (Aii) is generally present in an amount from about 0% or about 0.01%, or about 10%, or about 15% up to about 20%, or to about 25% by weight.

The vinyl aromatic monomer includes styrene and the various substituted styrenes. In one embodiment, the vinyl aromatic monomer is represented by the following formula:

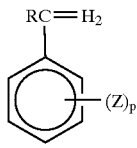

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyl toluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Specific examples of polymers of vinyl aromatic compounds include polystyrene, poly(alpha-methylstyrene), poly(p-methylstyrene) and high impact polystyrene (HIPS). Polystyrene is a preferred vinyl aromatic homopolymer. A commercially available polystyrene, which is useful in this invention is Dart 108 polystyrene from Dart Polymer Inc.

In another embodiment, (Aii) is a polymer of a vinyl aromatic monomer and a monomer selected from the group consisting of an unsaturated mono- or dicarboxylic reagent and other vinyl monomers. The carboxylic reagents include carboxylic acids per se and their functional derivatives such as anhydrides, imides, metal salts, esters, etc., which are capable of being forming polymers with the vinyl aromatic monomer.

The unsaturated monocarboxylic acid reagents are carboxylic acids and esters corresponding to the formula:

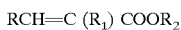

RCH=C (R$_1$) COOR$_2$ wherein R is hydrogen or a saturated aliphatic or alicyclic, aryl, alkaryl or heterocyclic group; R$_1$ is hydrogen or an alkyl group; and R$_2$ is hydrogen or an alkyl, aryl, or heterocyclic group. Preferably, R is hydrogen or an alkyl group containing from 1 to about 10 carbon atoms. Preferably, R$_1$ is hydrogen or an alkyl group containing from 1 to about 10 carbon atoms. Preferably, R$_2$ is hydrogen or an alkyl group having from 1 to about 10 carbon atoms. The total number of carbon atoms in R and R$_1$ should not exceed 18 carbon atoms. Specific examples of useful monobasic carboxylic reagents include acrylic acid, methacrylic acid, crotonic acid, acrylic anhydride, etc. Specific examples of esters include methyl, ethyl, propyl, and butyl acrylate and methacrylate.

In another embodiment, the unsaturated carboxylic reagent is a dicarboxylic reagent. An example of dicarboxylic reagents are maleic reagents. The maleic reagents may generally be represented by the formula:

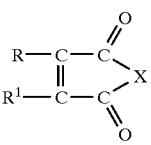

wherein each R or R$^1$ group is hydrogen or an aliphatic or aromatic hydrocarbyl group or the R and R$^1$ groups are joined together to form a fused ring derivative, X is —O— or =NR$^{11}$ where R$^{11}$ is a hydrocarbyl group which may be an aliphatic or an aromatic hydrocarbyl group such as phenyl, methyl, ethyl, propyl, butyl, etc. Preferably both R and R$^1$ groups are hydrogen.

Examples of maleic derivatives which are cyclic or bicyclic compounds include those obtained by a Diels-Alder reaction of butadiene with maleic anhydride or a maleimide. Those obtained by a Diels-Alder reaction of cyclopentadiene with maleic anhydride or maleimide, and those obtained by a Diels-Alder reaction of isoprene with maleic anhydride or an N-substituted maleimide. These cyclic or bicyclic derivatives have high glass transition temperatures. Examples of dicarboxylic reagents include maleic acid, maleic anhydride, fumaric acid, mesaconic acid, itaconic acid, citraconic acid, itaconic anhydride, citraconic anhydride, monomethyl maleate, monosodium maleate, etc.

The copolymers of the vinyl aromatic monomers with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic monomer to a temperature at which the vinyl aromatic monomer will polymerize, (2) stirring the polymerizing vinyl aromatic monomer while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic monomer is polymerizing. Procedures for preparing such copolymers are known in the art and have been described in, for example, U.S. Pat. No. 2,971,939.

In one embodiment, (Aii) is a styrene-maleic anhydride copolymer. The styrene-maleic anhydride copolymers (SMA) are available commercially from, for example, ARCO under the general trade designation Dylark. Examples include: Dylark DBK-290 reported to comprise about 18% by weight of maleic anhydride and about 82% by weight of styrene; Dylark 332 reported to comprise about 14% by weight of maleic anhydride and 86% by weight of styrene; and Dylark 134 reported to comprise about 17% by weight of maleic anhydride, the balance being styrene.

Other Dylark materials available include transparent grades: Dylark 132 (Vicat 109° C.), Dylark 232 (Vicat 123° C.), and Dylark 332 (Vicat 130° C.). Impact grades include Dylarks 150, 250, 350 and 700 which are believed to be blends and/or grafts of SMA with SBR.

Other examples of impact modified styrenic and alpha-methyl styrene copolymers with maleic anhydride and acrylonitrile include Arvyl 300 MR and 300 CR.

Low molecular weight styrene-maleic anhydride copolymers (Mw as low as 1500) also are useful and these are available commercially such as from Monsanto under the designation "Scripset" and from Atochem under the designation "SMA Resins." Sulfonated styrene-maleic anhydride copolymers (and their metal salts) also are available and useful in this invention. Two such products are available from Atochem: SSMA-1000 which is a sulfonated copolymer of about 50% styrene and 50% maleic anhydride; and SSMA 3000, a sulfonated SMA comprising about 75% styrene and 25% maleic anhydride.

Specific examples of copolymers of vinyl aromatic compounds include: styrene-acrylonitrile (SAN); styrene-acrylic acid; and styrene methacrylic acid.

Block Polymers (B)

The polymer blend also includes a block polymer of a vinyl aromatic monomer and a conjugated diene, a partially hydrogenated derivative thereof, or a selectively hydrogenated derivative thereof to which has been grafted a unsaturated carboxylic reagent. The block polymer of a vinyl aromatic monomer and a conjugated diene (B) is typically present in an amount from about 0.5%, or about 1% up to about 4%, or to about 6% or to about 9% by weight of the polymer composition. The block polymer (B) contains up to about 50% bound vinyl aromatic monomer. In one embodiment, (B) contains up to about 48%, or to about 45% bound vinyl aromatic monomer.

The block polymers, usually block copolymers, may be diblock, triblock, multiblock, starblock, polyblock or graft-block polymers. Throughout this specification and claims, the terms diblock, triblock, multiblock, polyblock, and graft or grafted-block with respect to the structural features of block polymers are to be given their normal meaning as defined in the literature such as in the Encyclopedia of Polymer Science and Engineering, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

Such block polymers may contain various ratios of conjugated dienes to vinyl aromatic monomer. Accordingly, multiblock polymers may be utilized which are linear or radial symmetric or asymmetric and which have structures represented by the formulae A-B, A-B-A, A-B-A-B, B-A-B, $(AB)_{0,1,2}$ . . . BA, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As is well-known, tapered polymer blocks can be incorporated in the multiblock copolymers by copolymerizing a mixture of conjugated diene and vinyl aromatic monomer monomers utilizing the difference in their copolymerization reactivity rates. Various patents describe the preparation of multiblock copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

The vinyl aromatic monomers which may be utilized to prepare the copolymers are described above. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 500,000, preferably from about 40,000 to about 300,000.

The average molecular weights of the individual blocks within the polymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the block polymer is from about 10% to about 80%, and the vinyl content is preferably from about 25% to about 65%, particularly 35% to 55% when it is desired that the modified block polymer exhibit rubbery elasticity. The vinyl content of the block polymer can be measured by means of nuclear magnetic resonance.

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, alpha-methylstyrene-isoprene-alpha-methylstyrene, and their partially hydrogenated derivatives. The diblock and triblock polymers are commercially available from a variety of sources under various trade names. An example of a commercially available diblock resin includes Solprene 314D (Phillips). A number of styrene-butadiene-styrene triblock polymers are sold by the Shell Chemical Company under the trademarks "Kraton 2103", "Kraton 2104," and "Kraton 2113." Such thermoplastic rubbery block polymers are made by anionic polymerization, and the above three identified Shell Kratons differ in molecular weight and viscosity, and also in the ratio of butadiene to styrene. For example, "Kraton 2103" and "Kraton 2113" have a styrene to butadiene ratio of 28:72 while "Kraton 2104" as a styrene to butadiene ratio of 30:70. Blends of diblock and triblock polymers are also available. Kraton 1118 (Shell) is a blend of SB diblock and SBS triblock polymers. A particularly useful styrene-butadiene block copolymer is Kraton G1701X.

Multiblock polymers of styrene and either isoprene or butadiene also are commercially available. Commercially available and preferred styrene-butadiene multiblock polymers include Stereon 841A (43% styrene:57% butadiene) and Stereon 845A which are available from The Firestone Tire & Rubber Company.

Radial or starblock copolymers are available from Fina under the general designation "Finaprene SBS Polymer". A particularly useful radial or starblock polymer is available commercially under the designation "Finaprene 414."

The selective hydrogenation of the block polymers may be carried out by a variety of well-known processes including hydrogenation in the presence of such catalysts as Raney nickel, noble metals such as platinum, palladium, etc., and soluble transition metal catalysts. Suitable hydrogenation processes which can be used are those wherein the diene-containing polymer or polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5% to about 20% of their original unsaturation content prior to hydrogenation.

In one embodiment, the conjugated diene portion of the block polymer is at least 90% saturated and more often at least 95% saturated while the vinyl aromatic portion is not significantly hydrogenated. Particularly useful hydrogenated block polymers are the hydrogenated block polymers of styrene-isoprene-styrene such as an (ethylene/propylene)-styrene block polymer. When a polystyrene-polybutadiene-polystyrene block polymer is hydrogenated, it is desirable that the 1,2-polybutadiene to 1,4-polybutadiene ratio in the polymer is from about 30:70 to about 70:30. When such a block polymer is hydrogenated, the resulting product resembles a regular polymer block of ethylene and 1-butene (EB). As noted above, when the conjugated diene employed is isoprene, the resulting hydrogenated product resembles a regular polymer block of ethylene and propylene (EP). One example of a commercially available selectively hydrogenated is Kraton G-1652 which is a hydrogenated SBS triblock comprising 30% styrene end blocks and a midblock equivalent is a polymer of ethylene and 1-butene (EB). This hydrogenated block polymer is often referred to as SEBS.

In another embodiment, the selectively hydrogenated block polymer is of the formula:

wherein n=0 or 1;
  o is 1 to 100;
  p is 0 or 1;
  each B prior to hydrogenation is predominantly a polymerized conjugated diene hydrocarbon block having a number average molecular weight of about 20,000 to about 450,000;
  each A is predominantly a polymerized vinyl aromatic monomer block having a number average molecular weight of from about 2000 to about 115,000; the blocks of A constituting about 5% to about 95% by weight of the polymer; and the unsaturation of the block B is less than about 10% of the original unsaturation. In other embodiments, the unsaturation of block B is reduced upon hydrogenation to less than 5% of its original value, and the average unsaturation of the hydrogenated block polymer is reduced to less than 20% of its original value.

The block polymers of the vinyl aromatic monomer and the conjugated diene may also be grafted with one or more of the above described unsaturated monocarboxylic or dicarboxylic reagents. The carboxylic reagents include carboxylic acids per se and their functional derivatives such as anhydrides, imides, metal salts, esters, etc., which are capable of being grafted onto the selectively hydrogenated block polymer. The grafted polymer will usually contain from about 0.2% to about 20%, and preferably from about 0.1% to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preparation of various selectively hydrogenated block polymers of conjugated dienes and vinyl aromatic monomers which have been grafted with a carboxylic acid reagent is described in a number of patents including U.S. Pat. Nos. 4,578,429, 4,657,970, and 4,795,782, and the disclosures of these patents relating to grafted selectively hydrogenated block polymers of conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated polymers of styrene and butadiene include Kraton FG1901X from Shell, often referred to as a maleated selectively hydrogenated SEBS polymer.

Block Polymers (C)

The polymer blend also includes a block polymer of a vinyl aromatic monomer and a conjugated diene, or a partially hydrogenated derivative thereof, or a selectively hydrogenated derivative thereof to which has been grafted a unsaturated carboxylic reagent. (C) is generally present in an amount from about 2%, or about 3%, or about 4% up to about 10%, or to about 12% by weight. (C) contains greater than 60% by weight bound vinyl aromatic monomer. In another embodiment, (C) has greater than about 65%, or greater than about 70%, or greater than about 72% by weight bound vinyl aromatic monomer. The vinyl aromatic monomer and the conjugated diene are described above. (See Block Polymers (B).)

Examples of useful block polymers having greater than 60% by weight bound vinyl aromatic monomer include Phillips K Resins 03, 04 and 05, available from Phillips Petroleum Company. Generally, the K-Resins have a high polystyrene content such as about 75%, and these resins are transparent and rigid. One particularly preferred block polymer is K-Resin KR03 from Phillips. A similar material (75% styrene:25% butadiene) is available from Fina under the designation "Finaclear 520."

Fibers (D)

The polymer blend also contains fibers (D). The polymer blend generally comprises by weight from about 0.75% to about 8% fiber, preferably from about 1% to about 8% fiber, and more preferably from about 2% to about 6% fiber. The fibers may be either organic or mineral (inorganic) in nature. Also, mixtures of various types of fibers may be employed. Suitable materials include glass fiber, carbon fiber, jute and synthetic polymer fibers. An example of one class of synthetic fibers are aramid fibers such as DuPont's KEVLAR® and polyester, polyamid and acrylic fibers.

One preferred fiber is glass fibers. The glass fibers may be treated with coupling agents to improve the bond between the glass fibers and the polymer resins. For example, the glass fibers can be treated with materials such as fatty acids (e.g., stearic acid), silanes, maleated polypropylene, etc. The amount of coupling agent used is an amount effective to improve the bond between the glass fibers and the polymer resin.

The fibers preferably have an average diameter of from about 5 to about 25 microns and an average length of from about 0.125" to about 0.500". Preferably, the fibers have an aspect ratio of from about 10 to about 500 (i.e., the ratio of the fiber length to the fiber diameter).

Calcium Carbonate (E)

The polymer blend also includes calcium carbonate ($CaCO_3$). The polymer blend generally comprises from about 10% to about 40%, or preferably from about 20% to about 30% calcium carbonate. The $CaCO_3$ preferably has an average particle size of from about 1 to about 14 microns. Preferably, both the glass fibers (D) and the $CaCO_3$ are used in as dry a state as reasonably practical.

Mica (F)

Preferably, the polymer blend includes from about 0.50, or about 1% up to about 5% or 10% mica. The mica is in flake form having an average particle size of from about 40 to about 500 microns with an aspect ratio of from about 10 to about 150.

Miscellaneous Additives

Various additives may be included in the polymer blend at various rates of addition. Such additives include, for example, light stabilizers. Generally, additives are included in the polymer blend at a rate of less than 3%, preferably less than 2%.

Preparation of Polymer Blends

The blended polymer compositions of the present invention can be prepared by techniques well-known to those skilled in the art. For example, a particularly useful procedure is to intimately mix the polymers using conventional melt mixing equipment such as a mill, a Banbury, a Brabender, a single or twin screw extruder, continuous mixers, kneaders, etc. For example, the polymers may be intimately mixed in the form of granules and/or powder in a high shear mixer. One preferred process for preparing the blended polymers utilizes the Farrell Compact Processor, CP-23 and CP-57. Short residence times and high shear are readily obtained in a CP-23 and a CP-57. "Intimate" mixing means that the mixture is prepared with sufficient mechanical shear and thermal energy to produce a dispersed phase which is finely divided and homogeneously dispersed in the continuous or principal phase.

Various features and aspects of the present invention are illustrated further in the examples that follow. While these examples are presented to show one skilled in the art how to operate within the scope of this invention, they are not to serve as a limitation on the scope of the invention where such scope is only defined in the claims.

Unless otherwise indicated in the following examples and elsewhere in the specification and claims, all parts and percentages are by weight, temperatures are in degrees centigrade and pressures are at or near atmospheric.

EXAMPLE 1

Blended polymer compositions 1–5 in accordance with the present invention are prepared on a Farrell Compact Processor, CP-57 at a mixer rotor speed of 500 rpm and extruded at about 220° C. into strands which are passed through a water bath and air wipe prior to pelletizing.

| Component | Blend 1 | 2 | 3 | 4 | 5 |
|---|---|---|---|---|---|
| Polypropylene Homopolymer | 28.9 | — | 44.3 | 46.8 | 43.26 |
| Polypropylene Copolymer | 28.9 | 61.8 | — | — | — |
| Dart 108 Polystyrene | — | — | 13.8 | 14.0 | 15.03 |
| Phillips KR-03 | 7.0 | 7.0 | 5.7 | 2.5 | 2.0 |
| Stereon 841R | 1.0 | 1.0 | — | — | — |
| Calcium Carbonate | 30.0 | 24.0 | 28.0 | 28.5 | 25.0 |
| Glass Fiber (OCF 144A) | 4.0 | 4.0 | 3.0 | 4.0 | 3.0 |
| Irganox Stabilizer B-225 | .20 | .20 | .20 | .20 | .2 |
| Dylark SMA | — | — | 1.0 | — | 1.0 |
| Finaprene 414 | — | — | 4.0 | 4.0 | 8.51 |
| Mica | — | 2.0 | — | — | 2.0 |

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A polymer blend comprising in weight percent:
   A. from about 55% to about 90% of a polymer composition comprising: (i) 75% to about 100% of a homopolymer or a copolymer of polypropylene; and optionally (ii) from about 0% to about 25% of a vinyl aromatic polymer;
   B. from about 0.5% to about 9% of at least one block polymer of a vinyl aromatic monomer and an aliphatic conjugated diene, a selectively hydrogenated block polymer of a vinyl aromatic monomer and an aliphatic conjugated diene, or a selectively hydrogenated block polymer of a vinyl aromatic monomer and an aliphatic conjugated diene to which has been grafted an unsaturated carboxylic reagent, wherein the block copolymer contains up to 50% by weight bound vinyl aromatic monomer;
   C. from about 2% to about 12% of at least one block polymer of a vinyl aromatic monomer and a conjugated diene, a partially hydrogenated block polymer of a vinyl aromatic monomer and a conjugated diene, or a selectively hydrogenated block polymer of a vinyl aromatic monomer and a conjugated diene to which has been grafted an unsaturated carboxylic reagent, wherein the block polymer contains greater than 60% by weight bound vinyl aromatic monomer;
   D. from about 2% to about 8% glass fibers having an aspect ratio of from about 10 to about 500 and a length of from about 0.125" to about 0.500"; and
   E. from about 20% to about 40% calcium carbonate.

2. A polymer blend as set forth in claim 1 including:
   F. from about 0.5% to about 10% by weight mica.

3. The polymer blend as set forth in claim 1 wherein said blend comprises from about 60% to about 70% polymer composition A.

4. The polymer blend as set forth in claim 1 wherein said polymer composition A comprises from about 80% to about 100% of a homopolymer or a copolymer of polypropylene (Ai).

5. The polymer blend as set forth in claim 1 wherein said component B comprises a selectively hydrogenated block polymer of styrene and isoprene or butadiene to which has been grafted maleic acid or anhydride and component C comprises a block polymer of styrene and isoprene or butadiene.

6. The polymer blend as set forth in claim 5 wherein said component C comprises a partially hydrogenated block polymer of styrene and isoprene or butadiene.

7. The polymer blend as set forth in claim 1 wherein the vinyl aromatic monomer of said components B and C is styrene and the conjugated diene of said components B and C is independently selected from the group consisting of butadiene and isoprene.

8. The polymer blend as set forth in claim 1 wherein the unsaturated carboxylic reagent of said components B and C is an unsaturated dicarboxylic reagent.

9. The polymer blend as set forth in claim 1 wherein the unsaturated carboxylic reagent of said components B and C is independently maleic acid or anhydride.

10. The polymer blend as set forth in claim 1 wherein said vinyl aromatic polymer A(ii) comprises a material selected from the group consisting of polystyrene, high impact polystyrene, styrene maleic anhydride copolymer and mixtures thereof.

11. The polymer blend as set forth in claim 1 wherein said polymer composition A comprises about 100% of a homopolymer or a copolymer of polypropylene.

12. The polymer blend as set forth in claim 1 wherein said copolymer of polypropylene comprises a copolymer of propylene and ethylene.

13. A polymer blend comprising in weight percent:

A. from about 60% to about 80% of a polymer composition comprising 75% to about 100% of a homopolymer or a copolymer of polypropylene;

B. from about 0.5% to about 9% of at least one block polymer of a vinyl aromatic monomer and an aliphatic conjugated diene, a selectively hydrogenated block polymer of a vinyl aromatic monomer and an aliphatic conjugated diene, or a selectively hydrogenated block polymer of a vinyl aromatic monomer and an aliphatic conjugated diene to which has been grafted an unsaturated carboxylic reagent, wherein the block copolymer contains up to 50% by weight bound vinyl aromatic monomer;

C. from about 2% to about 12% of at least one block polymer of a vinyl aromatic monomer and a conjugated diene, a partially hydrogenated block polymer of a vinyl aromatic monomer and a conjugated diene, or a selectively hydrogenated block polymer of a vinyl aromatic monomer and a conjugated diene to which has been grafted an unsaturated carboxylic reagent, wherein the block polymer contains greater than 60% by weight bound vinyl aromatic monomer;

D. from about 2% to about 8% glass fibers having an aspect ratio of from about 10 to about 500 and a length of from about 0.125" to about 0.500"; and E. from about 20% to about 40% calcium carbonate.

* * * * *